United States Patent
Kosarnig

(10) Patent No.: US 9,958,586 B2
(45) Date of Patent: May 1, 2018

(54) MOUNTING DEVICE FOR A SANITARY ELEMENT

(71) Applicant: Geberit International AG, Jona (CH)

(72) Inventor: Rolf Kosarnig, Ruti (CH)

(73) Assignee: GEBERIT INTERNATIONAL AG, Jona (CH)

( * ) Notice: Subject to any disclaimer, the term of this patent is extended or adjusted under 35 U.S.C. 154(b) by 0 days. days.

(21) Appl. No.: 14/183,756

(22) Filed: Feb. 19, 2014

(65) Prior Publication Data
US 2014/0241003 A1    Aug. 28, 2014

(30) Foreign Application Priority Data

Feb. 22, 2013    (EP) ..................... 13156357

(51) Int. Cl.
| | | |
|---|---|---|
| A41F 1/00 | (2006.01) |
| A61M 1/00 | (2006.01) |
| F21V 5/00 | (2018.01) |
| F21V 17/00 | (2006.01) |
| G02B 6/00 | (2006.01) |
| G02B 6/36 | (2006.01) |
| F21V 8/00 | (2006.01) |
| E03D 11/14 | (2006.01) |
| G02B 6/26 | (2006.01) |

(52) U.S. Cl.
CPC .......... *G02B 6/0001* (2013.01); *E03D 11/143* (2013.01); *E03D 11/146* (2013.01); *G02B 6/0096* (2013.01); *G02B 6/26* (2013.01)

(58) Field of Classification Search
CPC ... E03D 11/143; E03D 11/146; G02B 6/0001; G02B 6/0096; G02B 6/26; E03C 1/01

USPC ............................................ 362/133, 136, 83
See application file for complete search history.

(56) References Cited

U.S. PATENT DOCUMENTS

| | | | | |
|---|---|---|---|---|
| 2,004,933 A | * | 6/1935 | Davison .................... | E03C 1/01 4/252.2 |
| 3,590,392 A | * | 7/1971 | Hollander ............. | E03D 11/143 4/211 |
| 5,123,130 A | * | 6/1992 | Sanders ........................... | 4/661 |
| 5,727,870 A | * | 3/1998 | Grierson ............... | F21V 7/0008 362/225 |
| 5,896,600 A | | 4/1999 | Mills et al. | |

(Continued)

FOREIGN PATENT DOCUMENTS

| CN | 102026570 A | 4/2011 |
| CN | 202047463 U | 11/2011 |

(Continued)

OTHER PUBLICATIONS

Communication dated Dec. 14, 2016, from the State Intellectual Property Office of the P.R.C., in counterpart Chinese application No. 2014100595765.

*Primary Examiner* — Tsion Tumebo
(74) *Attorney, Agent, or Firm* — Sughrue Mion, PLLC

(57) ABSTRACT

A mounting device (26) for a sanitary element comprises a mounting frame (30) to hold the sanitary element and a lighting unit (B) connected to the mounting frame, which comprises a first optical means (1) having at least one light source (3) for providing a first glow of light (5) and at least one second optical means (2) having at least one light source (4) for providing a second glow of light (6), wherein the said glows of light (5, 6) can be output from the mounting device (26).

16 Claims, 5 Drawing Sheets

(56) References Cited

U.S. PATENT DOCUMENTS

| | | | | |
|---|---|---|---|---|
| 5,937,599 | A * | 8/1999 | Gerischer | A47K 3/284 52/277 |
| 8,277,070 | B1 * | 10/2012 | Schwarz | E03C 1/33 312/140.1 |
| 8,678,616 | B2 * | 3/2014 | Marquardt | A47F 3/001 362/235 |
| 2003/0169160 | A1 * | 9/2003 | Rodriguez Barros | B60Q 1/2665 340/426.1 |
| 2006/0133065 | A1 * | 6/2006 | Douglass | 362/101 |
| 2009/0000017 | A1 | 1/2009 | Zhou | |
| 2009/0154186 | A1 * | 6/2009 | Natsume | B60Q 1/0041 362/516 |
| 2011/0164418 | A1 * | 7/2011 | Kaneda | A47K 1/04 362/235 |
| 2011/0204009 | A1 * | 8/2011 | Karan | A47F 1/12 211/59.2 |

FOREIGN PATENT DOCUMENTS

| | | |
|---|---|---|
| DE | 72 37 302 U | 3/1973 |
| DE | 25 00 889 A1 | 7/1976 |
| DE | 10 2007 057214 A1 | 6/2009 |
| EP | 2 281 957 A2 | 2/2011 |
| EP | 2 439 348 A1 | 4/2012 |
| FR | 2 951 204 A1 | 4/2011 |
| JP | 5-41103 A | 2/1993 |
| JP | 2001-107426 A | 4/2001 |

* cited by examiner

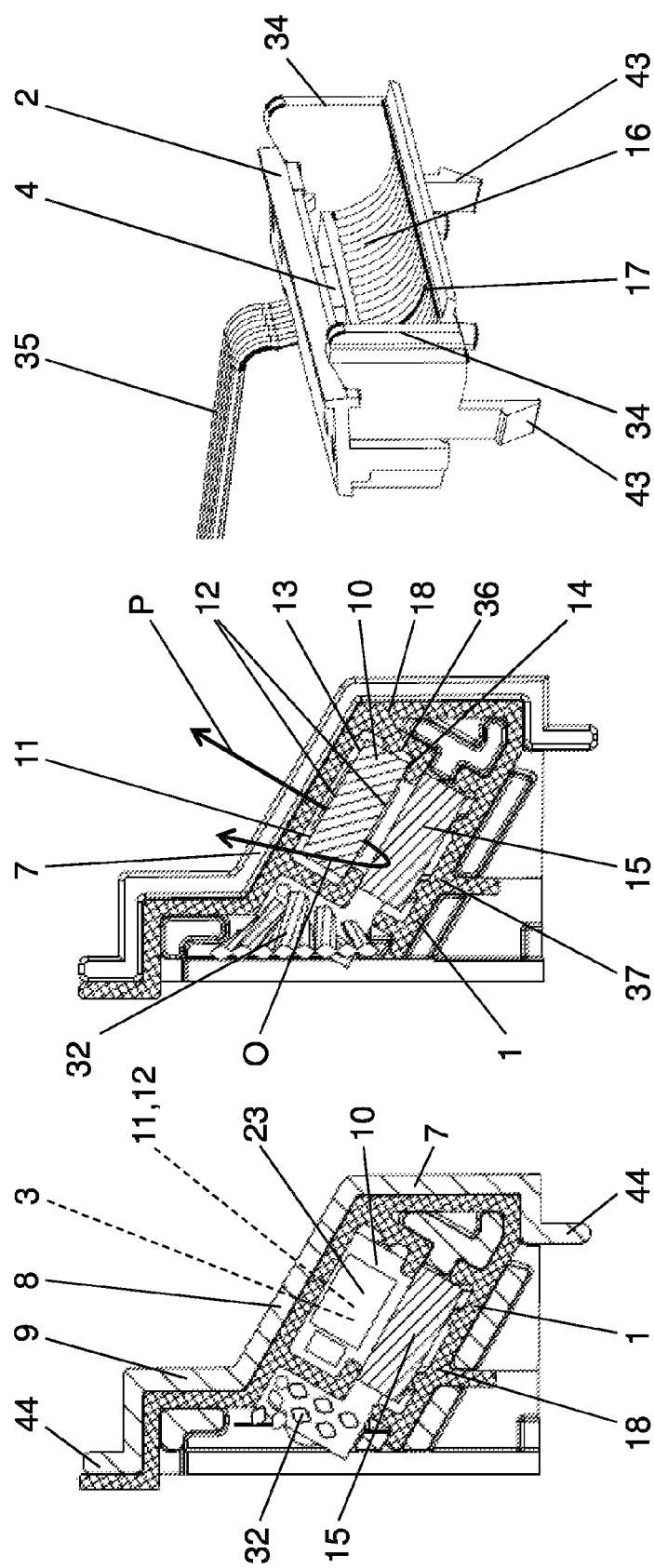

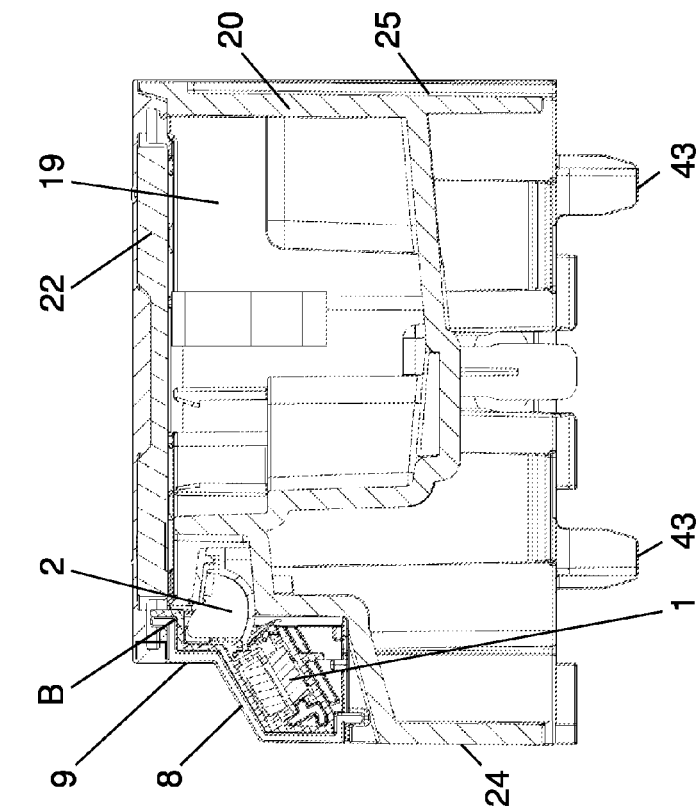
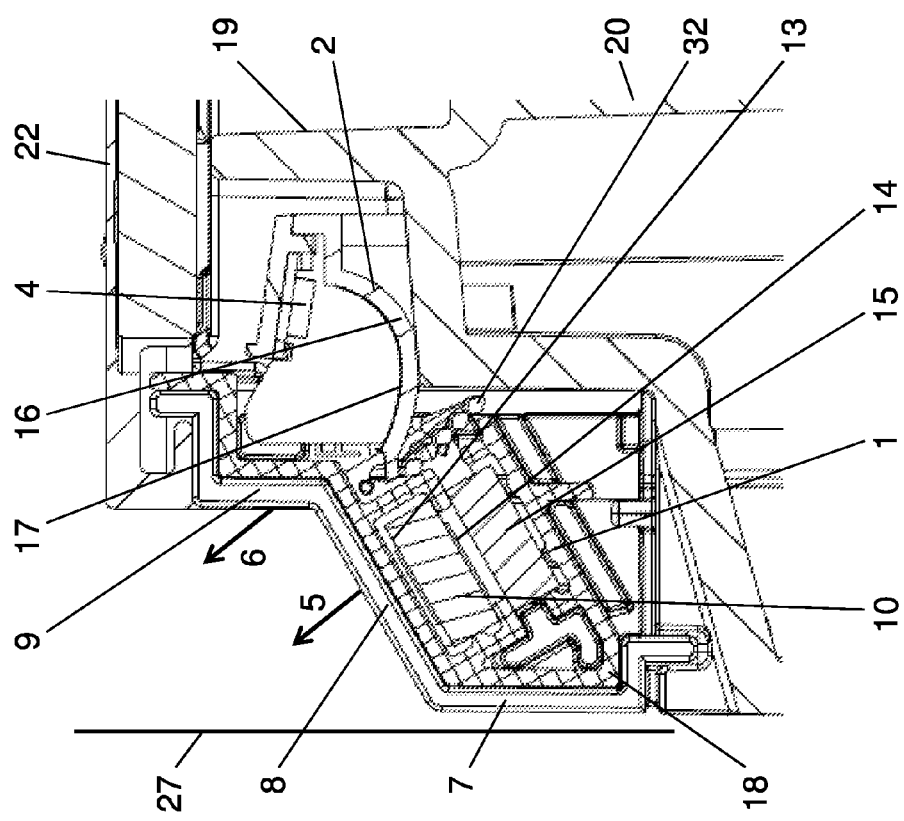

MOUNTING DEVICE FOR A SANITARY ELEMENT

TECHNICAL FIELD

The present invention relates to a mounting device for a sanitary element, in particular a toilet bowl, a urinal or a wash basin, having a lighting device according to claim 1.

PRIOR ART

Mounting devices for sanitary elements are known from the prior art. For instance, EP 2 439 348 shows such a mounting device. The mounting device comprises a mounting frame which is clad with decorative elements. Towards the top, the mounting frame is closed off with a decorative element in the shape of a cover.

SUMMARY OF THE INVENTION

On the basis of this prior art, the invention is based on the object of improving the detectability of a mounting device as such and the detectability of the state of elements connected to the mounting device.

This object is achieved by the subject-matter of claim 1. Accordingly, a mounting device for a sanitary element comprises a mounting frame to hold the sanitary element and a lighting unit connected to the mounting frame. The lighting unit comprises a first optical means having at least one light source for providing a first glow of light and at least one second or further optical means having at least one light source for providing a second glow of light, wherein the said glows of light can be output from the mounting device.

The arrangement of at least two optical means with which a glow of light can be output in each case has the advantage that patterns that can be perceived differently can be provided. For example, the first glow of light is able to provide illumination originating from the mounting device, and the second glow of light can indicate to the user an operating state of the mounting device or of elements connected to the mounting device.

Preferably, the first optical means is arranged in relation to the second optical means such that the first glow of light and the second glow of light overlap partly, in particular only partly, or that the first glow of light lies beside the second glow of light.

The overlapping has the advantage that the user is readily able to detect at a glance possible faulty states, which are indicated by using the first and the second optical means.

Particularly preferably, the first glow of light extends over the entire width of the mounting frame and the second glow of light extends over only part of the width of the mounting frame. With regard to the height, the second glow of light is preferably greater than the first glow of light.

Preferably, the lighting unit comprises a transparent or partially transparent or translucent covering, where the optical means are concealed by the covering and the glows of light can be output through the covering. Seen from outside, the optical means are therefore arranged within the mounting device and concealed by the covering, where the glows of light can be output through the covering.

Preferably, the covering extends along a longitudinal direction and has flat areas. The first glow of light is exclusively or primarily output via a first flat area, and the second glow of light is output exclusively or primarily via a second flat area, the flat areas being at an angle to each other. The first optical means are arranged in the region of the first flat area, and the second optical means are arranged in the region of the second flat area. The arrangement of the flat areas has the advantage that the glows of light act differently and can be perceived differently as a result of the output via the different flat areas.

Preferably, the first flat area runs vertically when installed and the second flat area runs at an angle to the vertical.

Preferably, the first optical means comprises an optical waveguide having at least one input coupling point and at least one output coupling point, the light source coupling light into the optical waveguide via the input coupling point and coupling light out via the output coupling point to provide the first glow of light.

Particularly preferably, the optical waveguide is formed to be rod-like with two ends and at least a front outer surface and a rear outer surface, the end representing the input coupling point and there being at least one output coupling point, preferably multiple output coupling points, on the front and/or rear outer surface. The multiple output coupling points are separated from one another and defined by opaque regions printed onto the optical waveguide. As a result of the arrangement of the opaque regions, the light course of the first glow of light can be adapted. The opaque regions are preferably stripes, which are printed on at a distance from one another.

Preferably, the front outer surface is aimed towards the covering. Furthermore, if the output coupling points are present on the rear outer surface, a reflector is arranged parallel to the optical waveguide and opposite the rear outer surface of the latter, which reflector reflects light which emerges via the rear outer surface towards the optical waveguide.

Particularly preferably, the optical waveguide extends substantially over the entire width of the mounting device. In this way, the first glow of light likewise extends over the entire width of the mounting device, which means that a particularly good illumination can be provided in the event of darkness in a room.

Preferably, the second optical means comprises a reflector having a reflective surface, the second light source outputting the light onto the reflective surface, which then provides the second glow of light.

Preferably, the reflector of the second optical means is shorter in its length than the optical waveguide, as viewed along the longitudinal direction. The glow of light from the second optical means is in this case different from the glow of light from the first optical means.

Particularly preferably, the optical waveguide is arranged behind the first flat area and the reflector of the second optical means is arranged behind the second flat area, the optical waveguide shining into the first flat area and the reflector shining into the second flat area.

Preferably, the lighting unit further comprises a supporting element, the first optical means and/or the second optical means and/or the covering being mounted on the supporting element, the supporting element preferably having the shape of a profile extending in the longitudinal direction and, in some sections, being in a flat combination with the covering. By using the supporting element, the parts connected to the supporting element can be connected to the mounting device.

Particularly preferably, the mounting device further comprises a cover, which can be connected to an upper side of the mounting frame, the cover having a carrier element having holding points to hold the lighting unit and a casing element that can be connected to the carrier element. The casing element can also be designated as a decorative element. The carrier element is used to hold the optical means, in particular via the supporting element.

In a particularly preferred development of the invention, the first optical means and the covering form a unit, which can be connected to the holding points of the carrier element. Particularly preferably, this unit additionally comprises the supporting element. The unit and/or the supporting element and/or the reflector of the second optical means can be connected to the holding points of the carrier element. Preferably, the connection is made via a plug-in connection.

Preferably, the lighting unit further comprises a control device, with which the optical means can be activated. By means of the control device, in particular the state, shape, intensity and/or colour of the glow of light can be controlled. Furthermore, the lighting unit comprises a brightness sensor, connected to the control unit, for detecting the brightness in a room, which brightness sensor is arranged behind the covering. Alternatively or additionally, the lighting unit further comprises a presence sensor, connected to the control unit, which detects the presence of a person in the room. When a person is present, the first and/or the second optical means can be activated.

The control device can additionally be connected to further functional elements on the mounting device. For example, to a fan for smell extraction, it being possible for the first and/or the second optical means to be activated when the fan is switched on.

Preferably, the mounting device has a rear side and a front side, the rear side, when installed, being aimed towards a wall running vertically, the first glow of light and the second glow of light being aimed towards the wall, the first flat area of the covering running at an angle to the rear side and the second flat area of the covering running at a distance from and parallel to the rear side and to the wall.

Preferably, the mounting device comprises connecting pipes and/or fixing elements for the connection of at least one sanitary element to the mounting device. Particularly preferably, the said connecting pipes and/or fixing elements extend away from the front side from the mounting device. The fixing elements are, for example, threaded rods which protrude away from the mounting device, or profiles present in the mounting device, into which the sanitary element can be hooked.

Further embodiments are specified in the dependent claims.

BRIEF DESCRIPTION OF THE DRAWINGS

Preferred embodiments of the invention will be described below by using the drawings, which serve merely for explanation and are not to be construed as restrictive. In the drawings:

FIG. 5 shows a sectional illustration according to FIG. 4 in the edge region;

FIG. 6 shows a sectional illustration according to FIG. 4 in the central region;

FIG. 7 shows a perspective view of an optical means;

FIG. 8*a* shows a sectional illustration through the lighting unit according to one of the preceding figures; and FIG. 8*b* shows an enlarged view of FIG. 8*a*.

DESCRIPTION OF PREFERRED EMBODIMENTS

Figure 1:
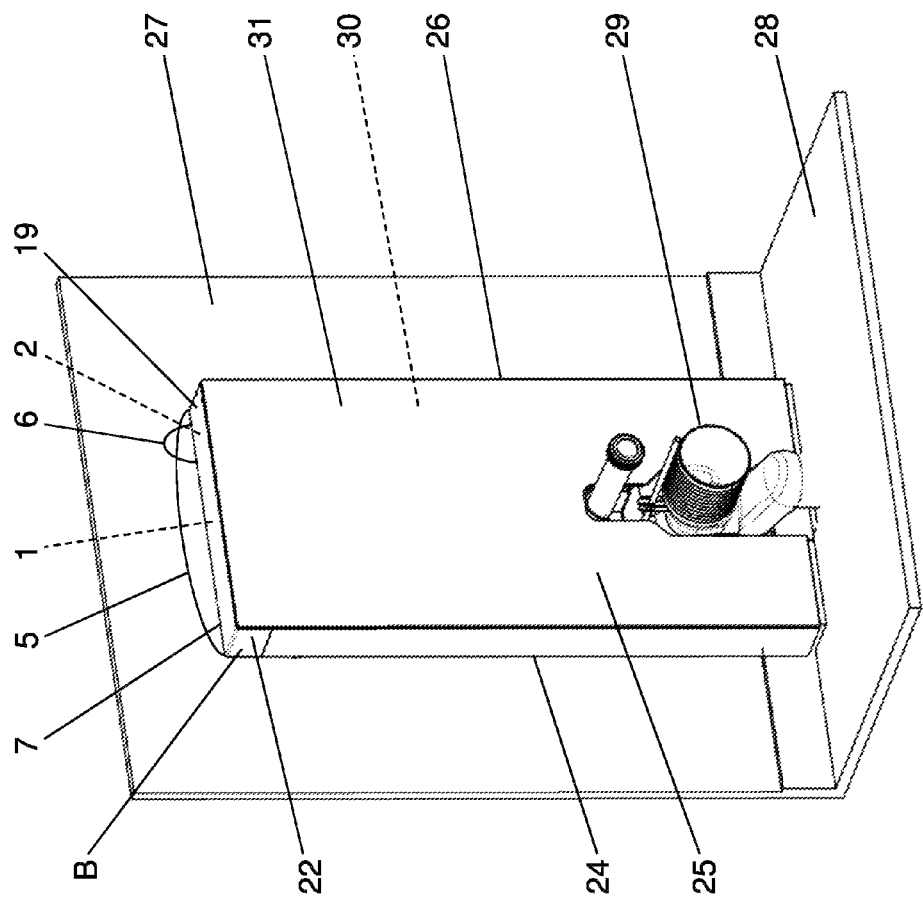
FIG. 1 shows a schematic perspective view of a sanitary device having a lighting unit according to one embodiment of the invention.

In FIG. 1, a mounting device 26 for a sanitary element is shown. Here, the mounting device 26 stands in front of a wall 27 or a floor 28. The wall 27 runs in the vertical and the floor 28 in the horizontal. The mounting device 26 can, however, also be fixed directly to the wall. In the lower area, the mounting device 26 here has connecting pipes and fixing elements 29 for the connection of a sanitary element, not shown here, to the mounting device 26. The sanitary element in the present case is, for example, a toilet bowl. In alternative embodiments, the sanitary element can be a wash basin or a urinal. The connecting pipes and fixing elements 29 and the arrangement of the same with respect to the mounting device 26 must then be adapted accordingly.

The mounting device here comprises a mounting frame 30 to hold the sanitary element mechanically. The mounting frame 30 is covered here by decorative elements 31, which surround the mounting frame 30 completely, at least towards the front and the sides.

The mounting device 26 can be constructed, for example, in accordance with EP 2 439 348. However, other constructions are also conceivable.

The mounting device 26 has a lighting unit B connected to the mounting frame. In the present example, the lighting unit B is arranged in the upper area of the mounting device 26. Particularly preferably, the lighting unit B is part of a cover 19, which delimits the mounting device 26 towards the top.

As will be explained in more detail below, the lighting unit B comprises a first optical means 1 having at least one light source 3 for providing a first glow of light 5 and at least one second or further optical means 2 having at least one light source 4 for providing a second glow of light 6. The said glows of light 5, 6 can be output from the mounting device 26. In the embodiment according to FIG. 1, the first glow of light 5 extends over the entire width of the mounting device 26 and is output towards the wall 27 by the mounting device 26. The second glow of light 6 overlaps partly the first glow of light 5 here and extends upwards beyond this first glow of light 5. The second glow of light 6 is also aimed towards the wall 27. The user can therefore perceive the two glows of light 5, 6 on the wall 27. In other embodiments, more than the first and the second optical means can also be present, further glows of light then accordingly being provided.

The lighting unit B having the first optical means 1 and the second optical means 2 can be formed in one piece or in many parts. In the case of the multipart formation, for example, the first optical means 1 and the second optical means 2 can be fixed or replaced separately from one another.

The optical means 1, 2 are in direct contact with the mounting device 26 and are supported by the latter. Consequently, the mounting device 26 and the optical means 1, 2 form a common unit.

The first optical means 1 here is arranged in relation to the second optical means 2 such that the first glow of light 5 and the second glow of light 6 overlap partly. Here, the second glow of light 6 partly overlaps the first glow of light 5. There is therefore a surface area or a spatial area which is illuminated both by the first glow of light 5 and by the second glow of light 6. In an alternative embodiment, which is not illustrated in the figures, the first glow of light 5 lies beside the second glow of light 6.

In operation, the first optical means 1 and the further optical means 2 can be activated jointly or separately from each other. For example, it is conceivable that, by using the first optical means 1, the room is illuminated when in darkness and that, by using the second optical means 2, an operating state is indicated.

With reference to FIG. 1, it can further be seen that the mounting device has a rear side 24 and a front side 25. The rear side 24, when installed, is aimed towards a wall 27 running vertically. The first glow of light and the second glow of light 6 are likewise aimed towards the wall 27. The sanitary element is fixed to the mounting device via the front side 25.

Figure 2:
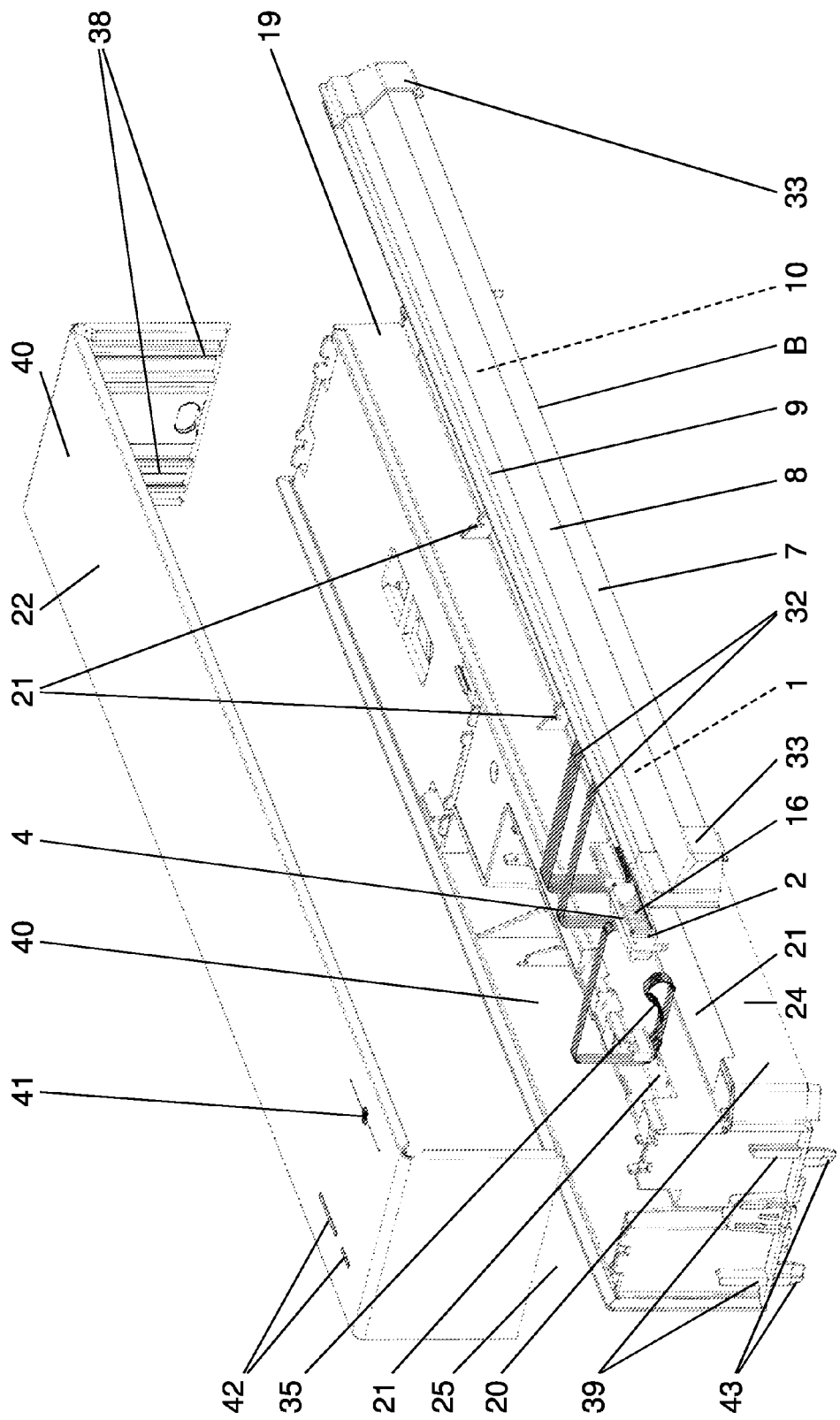
FIG. 2 shows a perspective exploded illustration of the lighting unit according to FIG. 1.

FIG. 2 shows an exploded illustration of the cover 19 and the lighting unit B. Here, the lighting unit B is arranged on the cover 19 and is connected to the mounting device 26 via the cover 19. The lighting unit B comprises a transparent or partially transparent or translucent covering 7. The optical means 1, 2 are concealed by this covering. In the installed state, the optical means 1, 2 are located behind the covering in the cover 19. The glows of light 5, 6 can be output through the covering 7 on account of the transparent, partially transparent or translucent properties of the covering 7. The first optical means cannot be seen directly from FIG. 2, since it is located behind the covering 7. Here, the second optical means 2 is illustrated at a distance from this covering 7. In the mounted state, the second optical means 2 will likewise be located behind the covering 7. This is shown in FIG. 3, where the two optical means are both located behind the covering 7 and are thus protected by the latter.

Figure 4:
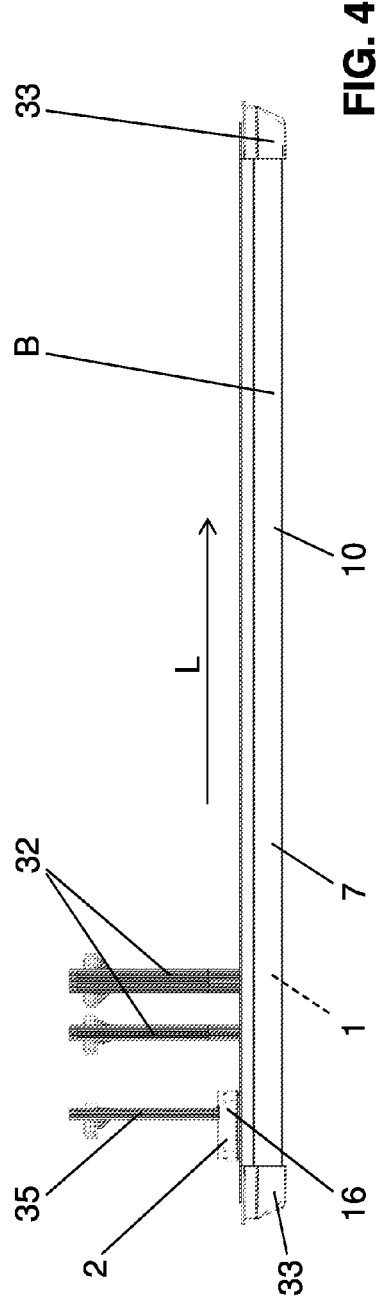
FIG. 4 shows a plan view of two optical means of the lighting unit according to the preceding figures.

In FIG. 4, the lighting unit B is shown separately, here, too, the first optical means 1 still being located behind the covering 7. Some sections of the second optical means 2 project out of the lighting unit B behind the covering 7. Of the first optical means, only the connecting cables 32 can be seen. It can easily be seen from FIG. 4 that the covering 7 extends along a longitudinal direction L and has flat areas 8, 9. The first optical means 1 is arranged in this case in the region of the first flat area 8. The first glow of light 5 can be output via this first flat area 8. Depending on the construction, the first glow of light can be output via this first flat area 8 exclusively or else only primarily. In the last embodiment, parts of the glow of light are also output via other areas. The second optical means 2 is arranged in the region of the second flat area 9. The second glow of light 6 in this case can be output via this second flat area 9. The second glow of light 6 can be output to the same extent as the first glow of light 5. The glows of light 5, 6 are therefore output through the covering 7 via two different areas 8, 9. In the installed state, as shown in FIG. 1, the second flat area 9 runs vertically, that is to say parallel to the wall 27, and the first flat area 8 extends at an angle to the vertical.

Figure 3:
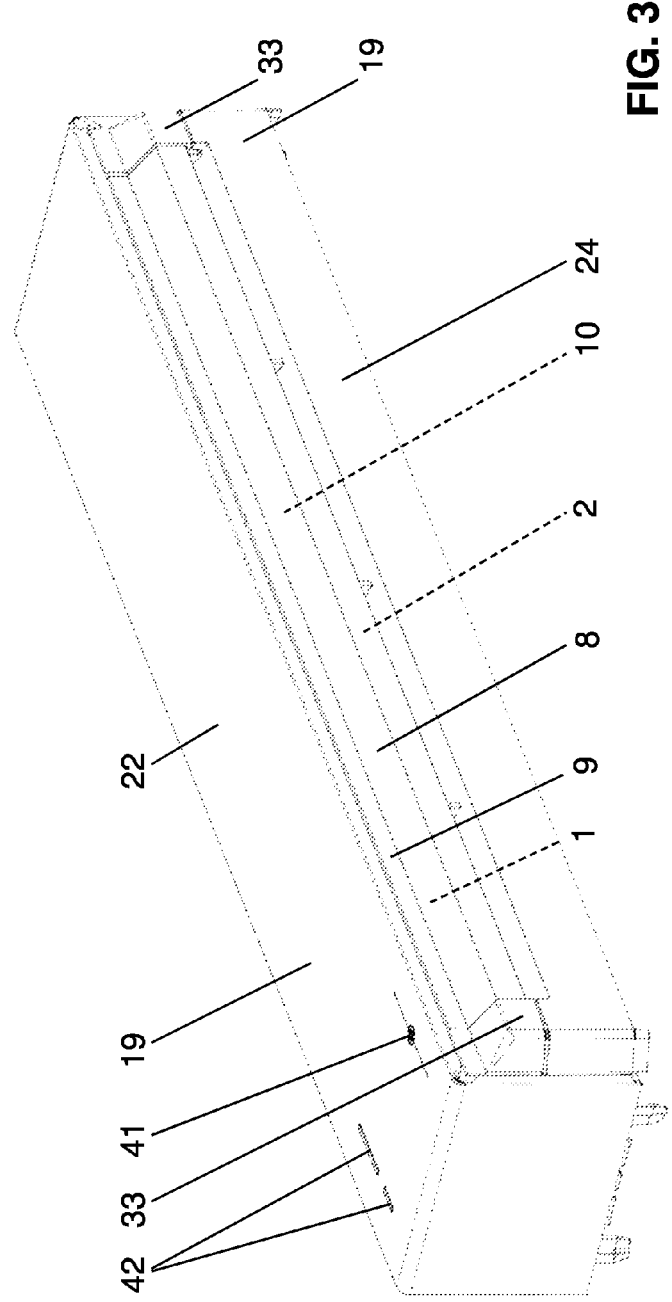
FIG. 3 shows a perspective illustration of the lighting unit according to FIGS. 1 and 2.

In FIG. 3, the cover 19 is shown from behind. The rear side 24 of the cover 19 and of the mounting device is arranged in contact with the wall 27 or at a slight distance from the wall 27. Thus, the second flat area 9 is located at a distance from the wall 27. It is also possible to say that, by means of this arrangement of the two flat areas 8, 9, a shadow gap is provided, the two glows of light 5, 6 being output via this shadow gap.

The first optical means 1 of the lighting unit B will now be described in more detail by using FIGS. 5 and 6. The first optical means 1 comprises an optical waveguide 10 having at least one input coupling point and at least one output coupling point 12. Here, the light source 3 couples light into the optical waveguide 10 via the input coupling point 11, and the light is coupled out of the optical waveguide via the output coupling point 12, by which means the first glow of light 5 is provided. The light source 3 is not shown directly in FIG. 5 or 6. The light source 3 is particularly preferably an RGB light-emitting diode, so that a multiplicity of different colours can be provided for the first glow of light 5. The first light source is connected via a cable 32 to a control system.

The optical waveguide 10 is preferably formed to be rod-like and, in addition to the two ends 11, comprises at least a front outer surface 13 and a rear outer surface 14. Here, the optical waveguide 10 has a rectangular cross section. The light is coupled in by the light source 3 via one of the two or the two ends 11. The ends are therefore the input coupling points. On the front and/or the rear outer surface 13, 14, there is at least one output coupling point, preferably multiple output coupling points 12. Thus, light can therefore be output via the front outer surface 13 and, if appropriate, via the rear outer surface 14. The multiple output coupling points 12 are separated from one another by opaque regions printed onto the optical waveguide 10. The opaque regions thus provide corresponding output coupling points 12 or define the same.

The front outer surface 13 here is aimed towards the covering 7. Via this front outer surface 13, the light is output forwards towards the covering 7 corresponding to the arrow P in FIG. 6. If the output coupling points 12 are present on the rear outer surface 14, a reflector 15 is arranged parallel to the optical waveguide 10 and opposite the rear outer surface 14 of the latter. The reflector 15 reflects the light which emerges via the rear outer surface 14 towards the optical waveguide and then likewise outputs the light towards the covering 7. This is illustrated accordingly by the arrow O.

The optical waveguide 10 extends substantially over the entire width of the mounting device 26. Thus, the glow of light 5 can accordingly be provided over the entire width of the mounting device 26 in accordance with FIG. 1. In the present case, substantially over the entire length is to be understood such that the optical waveguide 10 extends over a substantial width of the mounting device 26. In the present case, the optical waveguide 10 extends from a side covering 33, which provides the termination of the covering 7, to another side covering 33 located on the other side.

The said side covering 33 here is connected to the covering 7.

The second optical means 2 is illustrated perspectively in FIG. 7. The second optical means 2 comprises a reflector 16 having a reflector surface 17. The second light source 4 outputting light onto the reflector surface 17, by which means the light is correspondingly reflected on the reflector surface 17, and the second glow of light 6 is provided. At the sides, the reflector 16 and the reflector surface 17 are delimited by two side parts 34. The reflector surface 17 is formed so as to be curved here, so that a corresponding propagation of light results. The second light source is preferably likewise an RGB light-emitting diode, so that an extremely wide range of colours can be provided by the second light source 4. The second light source 4 is connected by cable 35 to a control system.

With respect to its length, the reflector 16, seen along the longitudinal direction L, is designed to be shorter than the first optical waveguide 10. This can be seen accordingly in FIG. 4. Here, the reflector is arranged on the left-hand end of the optical waveguide 10 and is substantially shorter than the optical waveguide 10.

In FIG. 8a, a cross section through the cover 19, in which the lighting unit B is installed, is shown.

FIG. 8b shows a detail view of the installation situation according to FIG. 8a.

From FIG. 8b, it can easily be seen that the first optical waveguide 10 is arranged behind the first flat area 8. Here, the first flat area 8 runs at an angle to the wall 27, which is vertical. The reflector 16 of the second optical means 2 is arranged behind the flat area 9. The reflector 16 of the second optical means 2 therefore shines into the second flat area 9. Consequently, the two glows of light are output in different directions.

The lighting unit B further comprises a supporting element 18. The supporting element 18 likewise extends along the longitudinal direction L and, in the present embodiment, is used to hold the first optical means 1. Furthermore, the covering 7 is likewise arranged on the supporting element 18. In the embodiment shown, the optical waveguide 10 is mounted in a U-profile-like section 36 in the supporting element 18. The reflector 15 is fixed in a section 37 resting on the U-profile-like section 36, behind the section 36. Via the supporting element 18, the optical waveguide 10 and the reflector 15 and also the covering 7 are connected to one another, so that these parts are accordingly provided as a unit. The unit is delimited on the left and right by appropriate side coverings 33.

Particularly preferably, the supporting element 18 is in the flat combination with the covering 7. It can also be stated that the supporting element 18 forms a part of the covering. The supporting element 18, like the covering 7, is likewise designed to be transparent or partially transparent or translucent.

The side coverings 33 can be designed to be opaque, transparent, partially transparent or translucent.

As already explained, the mounting device 26 comprises a cover 19, which can be connected to the mounting frame 30 via the upper side of the mounting frame 30. For this purpose, the cover 19 has fixing pins 43, which can be connected to the mounting frame. As shown in FIG. 2, the cover 19 comprises a carrier element 20 having holding points 21 to hold the lighting unit B and/or parts of the first optical means 1 and of the second optical means 2.

The reflector 16 of the second optical means 2 in the present embodiment comprises latching hooks 43, which can be connected to a holding point 21 of the carrier element. Furthermore, the covering comprises tabs 44, which can likewise be plugged into the holding points 21.

Furthermore, the cover 19 comprises a casing element 22 that can be connected to the carrier element 20. The casing element 22 can also be designated as a decorative element 22. The casing element 22 extends over the entire upper side of the mounting device 26 and laterally downwards over the height of the carrier element 20. The casing element 22 is connected to the carrier element 20 via guides 38 and corresponding mating pieces 39. Furthermore, the casing element 22 is used to hold actuating pushbuttons 42 for triggering a full-volume flush or a partial-volume flush or actuating pushbuttons 41 for actuating a fan for smell extraction.

Furthermore, the lighting unit B comprises a control device, not illustrated in the figures, with which the optical means 1, 2 can be activated. The control device could, for example, be arranged in an opening 40 in the carrier element 20. The control device is preferably supplied with electrical power via a power supply and is connected appropriately to the optical means 1, 2. Via the control device, the state, shape, intensity and/or colour of the glows of light 5, 6 can be controlled.

Particularly preferably, the lighting unit B further comprises a brightness sensor 23, connected to the control unit, for detecting the brightness in a room in which the mounting device is positioned. The brightness sensor 23 is preferably arranged behind the covering 7. The brightness sensor 23 is shown in FIG. 5. The brightness sensor 23 detects the brightness of the room through the covering 7.

Furthermore, the lighting unit B preferably comprises a presence sensor connected to the control unit. The presence sensor detects the presence of a person in the room. The presence sensor is preferably likewise arranged behind the covering 7.

LIST OF REFERENCE SYMBOLS

1 First optical means
2 Second optical means
3 Light source
4 Light source
5 First glow of light
6 Second glow of light
7 Covering
8 First flat area
9 Second flat area
10 Optical waveguide
11 Input coupling point
12 Output coupling point
13 Front outer surface
14 Rear outer surface
15 Reflector
16 Reflector
17 Reflector surface
18 Supporting element
19 Cover
20 Carrier element
21 Holding points
22 Casing element
23 Brightness sensor
24 Rear side
25 Front side
26 Mounting device
27 Wall
28 Floor
29 Connecting pipes/fixing elements
30 Mounting frame
31 Decorative element
32 Connecting cable
33 Side covering
34 Side parts
35 Cable
36 U-profile-like section
37 Section
38 Guides
39 Mating pieces
40 Opening
41 Actuating pushbutton
42 Actuating pushbutton
43 Fixing pin
44 Tabs

The invention claimed is:

1. A mounting device for mounting a sanitary element in front of a wall, comprising:
    a mounting frame to hold the sanitary element,
    a lid, which can be connected to the mounting frame via an upper side of the mounting frame, and
    a lighting unit comprising
        a first optical means having at least one light source for providing a first glow of light directed at least in part toward said wall, at least one second optical means having at least one light source for providing a second glow of light directed at least in part toward said wall, and
a supporting element, wherein at least one of the first optical means, the second optical means, and a covering being mounted on the supporting element,
wherein the first optical means is arranged in relation to the second optical means such that the first glow of light and the second glow of light overlap partly on said wall,
wherein the first optical means comprises an optical waveguide which extends substantially over the entire width of the mounting device and wherein the first optical means is configured to provide illumination originating from the mounting device,
wherein the second optical means comprises a reflector having a reflector surface, the second light source outputting the light onto the reflector surface, which then provides the second glow of light,
wherein the reflector of the second optical means is shorter in its length than the optical waveguide, as viewed along a longitudinal direction,
wherein the lid comprising a carrier element with holding points to hold the lighting unit;
wherein the first optical means and the covering and the supporting element form a unit, which can be connected to the holding points of the carrier element, and
wherein the reflector of the second optical means can be connected to the holding points of the carrier element.

2. The mounting device according to claim 1, wherein the covering is a transparent or translucent covering, where the optical means are concealed by the covering and the first and the second glow of light can be output through the covering.

3. The mounting device according to claim 2, wherein the covering extends along a longitudinal direction and has flat areas, the first optical means being arranged in the region of a first flat area, via which the first glow of light can be exclusively or primarily output, and the second optical means being arranged in the region of a second flat area, via which the second glow of light can be output exclusively or primarily, the flat areas being at an angle to each other.

4. The mounting device according to claim 3, wherein the second flat area runs vertically when installed and the first flat area runs at an angle to the vertical.

5. The mounting device according to claim 1, wherein the optical waveguide has at least one input coupling point and at least one output coupling point, the light source coupling light into the optical waveguide via the input coupling point and coupling light out via the output coupling point to provide the first glow of light.

6. The mounting device according to claim 5, wherein the optical waveguide is formed to have the shape of a rod with two ends and at least a front outer surface and a rear outer surface, the end representing the input coupling point and there being multiple output coupling points, on at least one of the front surface and the rear outer surface, the multiple output coupling points being separated from one another and are defined by opaque regions printed onto the optical waveguide.

7. The mounting device according to claim 2, wherein the front outer surface is aimed towards the covering and wherein, if the output coupling points are present on the rear outer surface, a reflector is arranged parallel to the optical waveguide and opposite the rear outer surface of the optical waveguide, which reflector reflects light which emerges via the rear outer surface towards the optical waveguide.

8. The mounting device according to claim 1, wherein the optical waveguide is arranged behind a first flat area of the covering and the reflector of the second optical means is arranged behind a second flat area of the covering, the optical waveguide shining into the first flat area and the reflector shining into the second flat area.

9. The mounting device according to claim 1, the supporting element has the shape of a profile extending in a longitudinal direction and, in some sections, being in a flat combination with the covering.

10. The mounting device according claim 1, wherein the lighting unit further comprises a control device, with which the optical means can be controlled, by which means at least one of the following state, shape, intensity and colour of the glows of light can be controlled, and wherein the lighting unit further comprises a brightness sensor, connected to the control device, for detecting the brightness in a room, which brightness sensor is arranged behind the covering.

11. The mounting device according to claim 1, wherein at least one of
(1) the mounting device has a rear side and a front side, the rear side, when installed, being aimed towards a wall running vertically, the first glow of light and the second glow of light being aimed towards the wall, and
(2) the mounting device comprises at least one of a connecting pipe a fixing element for the connection of at least one sanitary element to the mounting device.

12. The mounting device according to claim 1, wherein the reflector of the second optical means can be connected to the holding points of the carrier element.

13. The mounting device according to claim 10, wherein the lighting unit further comprises a presence sensor, connected to the control device, which detects the presence of a person in the room and is preferably arranged behind the covering.

14. An arrangement comprising:
a mounting device comprising:
a mounting frame to hold the sanitary element,
a lid, which can be connected to the mounting frame via an upper side of the mounting frame,
a lighting unit and
a sanitary element connected to the mounting device, in particular a toilet bowl, a urinal or a wash basin, the sanitary element being connected to the mounting device via at least one of a fixing element and a connecting pipe
wherein said lighting unit comprising
a first optical means having at least one light source for providing a first glow of light, and
at least one second optical means having at least one light source for providing a second glow of light, and
a supporting element, wherein at least one of the first optical means, the second optical means, and a covering being mounted on the supporting element,
wherein the first optical means is arranged in relation to the second optical means such that the first glow of light and the second glow of light overlap partly,
wherein the first optical means comprises an optical waveguide having at least one input coupling point and at least one output coupling point, the light source coupling light into the optical waveguide via the input coupling point and coupling light out via the output coupling point to provide the first glow of light,
wherein the optical waveguide of the first optical means extends substantially over the entire width of the mounting device and wherein the first optical means is configured to provide illumination originating from the mounting device, wherein the second optical means comprises a reflector having a reflector surface, the second light source outputting the light onto the reflector surface, which then provides the second glow of light, wherein the reflector of the second optical means is shorter in its length than the optical waveguide, as viewed along a longitudinal direction, and wherein the lid comprising a carrier element with holding points to hold the lighting unit;

wherein the first optical means and the covering and the supporting element form a unit, which can be connected to the holding points of the carrier element, and wherein the reflector of the second optical means can be connected to the holding points of the carrier element.

15. The arrangement according to claim 14, wherein the front outer surface is aimed towards the covering and wherein, if the output coupling points are present on the rear outer surface, a reflector is arranged parallel to the optical waveguide and opposite the rear outer surface of the latter, which reflector reflects light which emerges via the rear outer surface towards the optical waveguide.

16. The arrangement according to claim 15, wherein the optical waveguide is arranged behind a first flat area of the covering and the reflector of the second optical means is arranged behind a second flat area of the covering, the optical waveguide shining into the first flat area and the reflector shining into the second flat area.

* * * * *